(12) United States Patent
Gisselman et al.

(10) Patent No.: US 12,551,952 B2
(45) Date of Patent: Feb. 17, 2026

(54) POWER DRILL AND FORCE TRANSDUCER FOR SUCH A DRILL

(71) Applicant: ATLAS COPCO INDUSTRIAL TECHNIQUE AB, Stockholm (SE)

(72) Inventors: Hans Niklas Gisselman, Vega (SE); Daniel Hallberg, Sundbyberg (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 912 days.

(21) Appl. No.: 17/614,273

(22) PCT Filed: May 6, 2020

(86) PCT No.: PCT/EP2020/062571
§ 371 (c)(1),
(2) Date: Nov. 24, 2021

(87) PCT Pub. No.: WO2020/239378
PCT Pub. Date: Dec. 3, 2020

(65) Prior Publication Data
US 2022/0219249 A1    Jul. 14, 2022

(30) Foreign Application Priority Data
May 28, 2019   (SE) ................... 1930175-3

(51) Int. Cl.
  *B23B 45/00*   (2006.01)
  *B23Q 17/09*   (2006.01)
  *G01L 1/22*    (2006.01)

(52) U.S. Cl.
  CPC ........ *B23B 45/008* (2013.01); *B23Q 17/0966* (2013.01); *G01L 1/2231* (2013.01)

(58) Field of Classification Search
  CPC .. G01L 1/2231; B23Q 17/0966; B23B 45/008
  See application file for complete search history.

(56) References Cited

U.S. PATENT DOCUMENTS

| 4,688,970 A | 8/1987 | Eckman |
| 4,924,713 A * | 5/1990 | Machino ............ B23Q 17/0966 |
| | | 73/104 |

(Continued)

FOREIGN PATENT DOCUMENTS

| GB | 2126357 A | 3/1984 |
| JP | 55167137 U | 12/1980 |

(Continued)

OTHER PUBLICATIONS

Atlas Copco Industrial Technique AB; International Preliminary Report on Patentability for International Application No. PCT/EP2020/062571 dated Sep. 2, 2021, 14 Pages.

(Continued)

*Primary Examiner* — Daniel Jeremy Leeds
(74) *Attorney, Agent, or Firm* — Moore & Van Allen PLLC; W. Kevin Ransom

(57) ABSTRACT

The present specification relates to a power drill, comprising a housing in which a motor is arranged, and a front and rear bearing arranged to support an axle assembly adapted to engage a drill attachment, wherein said axle assembly and at least one of said front and said rear bearing further form an additional assembly movably arranged with respect to said housing, said power drill further comprising a force transducer arranged at said front end of said housing and axially supported by said housing, and wherein said additional assembly is axially supported by said force transducer, said force transducer thereby being configured to output a signal representing an axial force acting on said additional assembly. The present specification further relates to a force transducer for such a power drill and a detachable front part for a power drill.

15 Claims, 2 Drawing Sheets

(56) References Cited

U.S. PATENT DOCUMENTS 6,834,730 B2 * 12/2004 Gass ................ B25F 5/001
173/171
2007/0063620 A1 3/2007 Kluft

FOREIGN PATENT DOCUMENTS

| JP | 58136208 U | 9/1989 |
|----|------------|--------|
| JP | 04116454 U | 10/1992 |
| JP | H06312308 A | 11/1994 |
| JP | 2014104541 A | 6/2014 |

OTHER PUBLICATIONS

Atlas Copco Industrial Technique AB, Japanese Patent Application No. 2021-570805, Office Action, May 23, 2024.
Atlas Copco Industrial Technique AB, European Patent Application No. 20724483.1, Communication pursuant to Article 94(3) EPC, Jan. 12, 2023.
Atlas Copco Industrial Technique AB, International Application No. PCT/EP2020/062571, International Search Report, Aug. 6, 2020.
Atlas Copco Industrial Technique AB, International Application No. PCT/EP2020/062571, Written Opinion, Aug. 6, 2020.

* cited by examiner

POWER DRILL AND FORCE TRANSDUCER FOR SUCH A DRILL

CROSS-REFERENCE TO RELATED APPLICATIONS

This application is a National Stage Patent Application (filed under 35 § U.S.C. 371) of PCT/EP2020/062571, filed May 6, 2020 of the same title, which, in turn claims priority to Swedish Patent Application No. 1930175-3 filed May 28, 2019 of the same title; the contents of each of which are hereby incorporated by reference.

TECHNICAL FIELD

The present invention generally relates to power drills, more particularly to such drills comprising a force transducer for measuring a force exerted on the drill.

TECHNICAL BACKGROUND

Power drills for drilling in different materials are known to be used in various industries where, although requirements on the end result varies a lot, sometimes very high quality standards for the resulting holes are to be met.

Many factors influence the end result, i.e. the quality of the hole achieved for example in terms of entry roundness, entry concentricity, perpendicularity and conicality of the hole. Such factors include machining parameters where examples include drilling speed and feed rate and other factors such as drill bit wear. Further, depending on the material used, the axial force (i.e. the feed- or thrust force) may also have a significant influence on the end result achieved.

One common way of managing the feed force and hence at least to some degree the quality of the resulting hole, at least in the case of a hand held drill, is that the operator, based on skill and experience, simply applies what is considered an appropriate feed force. However, such methods are of course highly dependent on the skill and experience of the operator and therefore offer less repeatability. Further, no traceability is provided. Another issue is the lack of feedback provided to the operator, other than possible review after the drilling operation is finished which may reveal that the hole fails to fulfill the quality standards set.

In order to alleviate some of these problems, attempts have been made to use various types of force measuring devices, where examples include load cells, arranged in the drills.

However, there are many problems associated with such measurement devices remaining. For example related to measurement accuracy and further in that known devices tend to take up a lot of space and hence add to the size of the drill.

Hence, there exists a need for improvement in the field of force measurement in power drills.

SUMMARY OF THE INVENTION

Accordingly, it would be desirable to provide a design enabling improved measurements of the thrust force acting on the drill. In particular, it would be desirable to provide such functionality by means of a force transducer which does not require an unnecessary amount of space in the drill housing. To better address one or more of these concerns a power drill, a force transducer and a method as defined in the independent claims are provided. Preferred embodiments are defined in the dependent claims.

According to a first aspect of the invention a power drill is provided, the drill comprising a housing in which a motor is arranged and a front bearing and a rear bearing, the front and rear bearing being arranged at a front end of the housing to support an axle assembly drivingly connected to the motor at a first end and adapted at a second end to engage a drill attachment, wherein the axle assembly and at least one of the front bearing and the rear bearing further form an additional assembly movably arranged with respect to the housing such that an axial movement, in some cases a limited axial movement, between the housing and the additional assembly is allowed. The power drill further comprising a force transducer arranged at the front end of the housing, wherein the force transducer is axially supported by the housing and wherein the additional assembly is axially supported by the force transducer, the force transducer thereby being configured to sense a measured quantity and output a signal representing an axial force acting on the additional assembly. I.e. a force acting on or exerted by the drill, also referred to as the thrust force or feed force.

According to the first aspect, the power drill provides an inventive solution to the concerns described above by means of a design incorporating a force transducer and an axle assembly movably arranged with respect to this transducer which allows for accurate measurement of the axial force may to be obtained in an advantageously compact manner More particularly, the axle assembly is supported by two bearing of which at least one likewise is movably arranged with respect to the transducer. The force transducer provided in the inventive power drill is configured to sense a measured quantity indicative of the axial force acting on the additional assembly and therefore measures the force in the feed direction of the drill via the axle assembly, i.e. the thrust force. Further, the additional assembly is axially supported by the transducer which in turn is axially supported by the housing. For example, in one embodiment, the force transducer may bear axially against the housing, in other embodiments an adapter or similar component may be arranged there between such that the additional assembly bears against the adapter which in turn bears against the housing. Similarly, in one embodiment, the additional assembly may bear axially against the force transducer, whereas in other embodiment an additional component such as an adapter or washer or the like may be arranged there between.

The drill attachment mentioned above could for example be a chuck or in some cases a modular drill head and the referenced power drill may for example be a hand held drill or a fixtured drill. Further, according to one embodiment, the power drill comprises circuitry for controlling the drill. For example, such circuitry may comprise a processor and a memory containing instructions executable by the processor, which when run in the power drill causes the drill to provide feedback to an operator based on the signal representing an axial force acting on the additional assembly and/or to store data during drilling.

According to one embodiment, the force transducer comprises a disc shaped portion coaxially arranged with respect to the front and rear bearing, wherein the measured quantity is a quantity measured over the disc shaped portion. I.e. a flat, thin and circular portion. Hereby, a particularly compact and space efficient design may be achieved. Mora particularly, a design adding virtually no extra axial length to the drill may be achieved using a disc shaped design, thereby solving a common problem of known transducers.

According to one embodiment, the force transducer is arranged behind the rear bearing, in a direction defined from said first end to said second end of said axle assembly, or in other words in a direction along the axle defined from the motor to the end adapted to engage a drill attachment, such that the rear bearing is supported by the force transducer. Behind in this sense hence being a position closer to the motor. In another embodiment, the transducer may be arranged in front of the front bearing in the direction defined above.

For example, the rear bearing may bear against the force transducer. In such an embodiment, the additional assembly may comprise the axle assembly and the rear bearing. Hereby, the force exerted by the rear bearing on the transducer may be measured by the transducer. Arranging the transducer behind the rear bearing may be advantageous in that the length of the wiring needed for the transducer is likely to be shorter, reducing noise in the signals.

In one embodiment, the measured quantity is a quantity indicative of the axial force acting on the additional assembly. According to one embodiment, the measured quantity is a quantity indicative of a strain, wherein the force transducer comprises at least one strain gauge. For example, several strain sensors may be arranged in a bridge configuration such as a Wheatstone bridge configuration. Other types of load cells are however conceivable within the scope of the present application.

According to one embodiment, the force transducer comprises a first end portion extending in the axial direction, a second end portion extending in the axial direction, and an intermediate portion extending in a radial direction between the first and second end portion, thereby forming the disc shaped portion. This transducer design is advantageous not only due to its space saving properties but also since this design provides for both positive and negative strain values on one side of the transducer body as an axial force is exerted on the transducer will result in tension as well as compression. Hereby, measurements of for example strain is significantly facilitated as they may be performed on only one side of the transducer with maintained accuracy. As the skilled person is well aware, a positive strain and a corresponding negative strain is commonly used to amplify the output when using strain gauges, for example gauges arranged in a bridge configuration. By the term side should in this case, and throughout the present specification, be understood the opposite sides of the intermediate portion which are normal to the axle as the transducer is arranged in the drill. I.e., what may commonly be referred to as a front and back side of the disc shaped portion and hence of the transducer.

According to one embodiment, the first end portion is axially supported against the housing, and the additional assembly is supported against the second end portion. Hereby, the deformation and hence the strain mentioned above arise as the rear bearing, the assembly and optionally the front bearing is displaced towards the portion of the housing against which the first end portion of the transducer bears as a thrust force acts on the drill. More particularly, a tension will arise in a region closer to the second portion whereas a compression will arise in a region closer to the first portion, on the side of the transducer facing away from the additional assembly. In one embodiment, the first end portion bears axially against the housing. In another embodiment, the first end portion bears against an adapter or similar component which in turn bears against the housing. For example, in one embodiment, the rear bearing bears against the second portion.

According to one embodiment, the force transducer comprises at least two strain gauges, respectively arranged on a first and a second side of the disc shaped portion. E.g. on a respective annular face of the respective first and second side. For example, in some embodiments, the force transducer instead may be described as a substantially disc shaped washer, i.e. the disc shaped portion mentioned above in such an embodiment constitutes most of or even the whole transducer. Hereby, the transducer adds even less axial length to the drill. In such an embodiment, strain sensors may be arranged on both sides of the washer.

According to one embodiment, the force transducer is arranged behind the front bearing in a direction defined from said first end to said second end of said axle assembly, such that the front bearing is supported against the force transducer, such that the rear bearing is supported by the force transducer. Again, in other words in a direction along the axle defined from the motor to the end adapted to engage a drill attachment, and behind in this sense hence being a position closer to the motor. For example, the front bearing may bear against the force transducer. In such an embodiment, the additional assembly may comprise the axle assembly and the front bearing. Hereby, the force exerted by the front bearing on the transducer may be measured by the transducer. Arranging the transducer behind the front bearing may be advantageous in that the distance to the windings of the motor is increased, which may reduce noise in the signal due to lower electromagnetic interference from the motor. Further, an amplifier may be arranged closer to the transducer. Further advantages are related to the fact that the size of the front bearing, and hence the ability of the bearing to withstand reaction forces, may more easily be increased.

Accordingly, in one embodiment, the force transducer comprises at least one strain gauge arranged on a first side of the disc shaped portion. More particularly, on an annular face of this first side. For example, in one embodiment, a diaphragm strain gauge is arranged on one side of the disc shaped portion. A diaphragm strain gauge, also known as a membrane strain gauge, commonly comprising strain gauges arranged in a rosette or bridge configuration may be designed to fit the disc shaped portion of the force transducer.

According to one embodiment, the power drill further comprises a motor shaft connected to the motor at a first end and forming a sun gear at a second end, wherein the axle assembly comprises a planet carrier adapted to engage the drill attachment and at least one planet gear adapted to engage a ring gear arranged between the front bearing and the rear bearing, the motor shaft and planet carrier being coupled, or connected, via the ring gear and the at least one planetary gear. In one embodiment, the ring gear may be comprised by the axle assembly.

According to one embodiment, the axle assembly, the front bearing and the rear bearing together form the additional assembly movably arranged with respect to the housing.

According to a second aspect of the present invention, a force transducer for a power drill according to any of the embodiments described in the foregoing is provided.

According to a third aspect of the present invention, a method in a power drill according to any of the embodiments described in the foregoing for providing feedback to an operator is provided, wherein the feedback is a feedback based on the signal representing an axial force acting on the additional assembly. Hereby, quality of the finished hole may be improved. According to one embodiment, the feedback is a feedback provided during drilling, such that an operator exerting too much or too little force is alerted and given the opportunity to correct the force level applied already during drilling. Such feedback may be provided by means of visual, audible or haptic feedback to the operator. According to one embodiment, the feedback is a feedback provided after the drilling of a hole is finished. Hereby, the quality of the finished hole may be evaluated and the hole may be given an approved or not approved status. In one embodiment, the method further comprises the step of detecting drill bit wear by analysis of the data provided by the force sensor.

According to a fourth aspect of the invention a detachable front part for a power drill is provided, the drill comprising a housing in which a motor is arranged, the detachable front part comprising a front part housing adapted to be attached to the power drill housing and a front bearing and a rear bearing, the front and rear bearing being arranged in the front part housing to support an axle assembly adapted to be drivingly connected to the motor at a first end and adapted at a second end to engage a drill attachment, wherein the axle assembly and at least one of the front bearing and the rear bearing further form an additional assembly movably arranged with respect to the front part housing such that an axial movement, e.g. a limited axial movement, between the front part housing and the additional assembly is allowed. The front part further comprising a force transducer, wherein the force transducer is axially supported by the front part housing and wherein the additional assembly is axially supported by the force transducer, the force transducer thereby being configured to sense a measured quantity and output a signal representing an axial force acting on the additional assembly. In one embodiment, the front part further comprises circuitry, e.g. wiring, for signal transferring between the front part and the power drill and/or between the front part and a controller. Such signals may include the signal output from the force transducer.

Objectives, advantages and features conceivable within the scope of the second, third and fourth aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWING

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
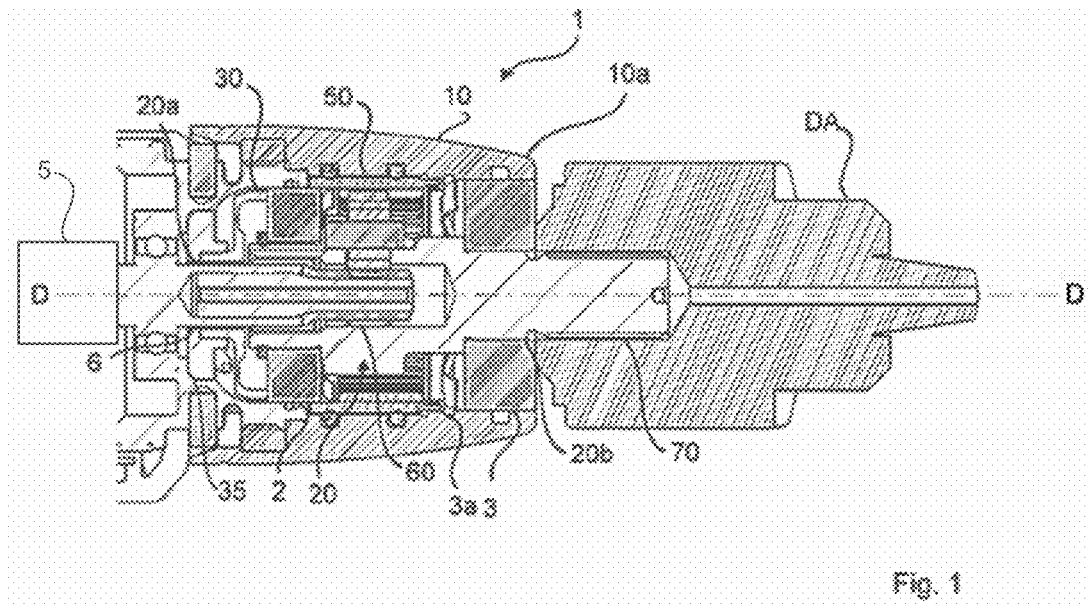
FIG. 1 is a cross sectional view of a front end of an exemplary power drill according to one embodiment.

A front end of an exemplary power drill 1, more particularly a handheld power drill, is shown in cross sectional view in FIG. 1, the drill comprising a housing 10 and a motor 5 arranged at a left side of the housing. A motor shaft 6 is connected to the motor 5 at a first end and forms a sun gear 60 at a second end. A front bearing 3 and a rear bearing 2 are arranged at a front end 10 a of the housing 10 to support an axle assembly 20 and a spring 3 a is arranged to bias the bearings. The axle assembly is drivingly connected to the motor 5 at a first end 20 a and adapted at a second end 20 b to engage a drill attachment DA, in the illustrated embodiment a drill chuck. More particularly, the axle assembly 20 comprises a planet carrier 70 adapted to engage the drill chuck and a number of planet gears connecting the motor shaft 6 (i.e. the sun gear formed thereby and the planet carrier 70 via a ring gear 50 arranged between the front bearing 3 and the rear bearing 2). The skilled person realizes that the front end shown in FIG. 1 may also form a detachable front part of a power drill 1.

The axle assembly 20 and, in the illustrated embodiment, the front bearing 3 and the rear bearing 2 together form an additional assembly which is movably arranged with respect to the housing 10. Hereby, a limited axial movement between the housing 10 and the additional assembly is allowed.

A force transducer 30 is also arranged at, i.e. close to, the front end 10a of the housing 10. More particularly, the force transducer is axially supported by the housing, in the illustrated embodiment the transducer bears against an adapter 35 which in turn bears against the housing. Further, the additional assembly mentioned above in turn bears axially against the force transducer 30, in this case via the rear bearing 2. Hence, when drilling is performed, the thrust force on the additional assembly may be measured by the transducer portion against which the assembly bears since the force transducer is configured to sense the resulting strains and output a signal representing this axial force acting on the assembly. The force being due to the limited displacement of the additional assembly with respect to the housing 10 mentioned above.

The force transducer 30 in the illustrated embodiment is arranged behind the rear bearing 2, that is to say behind in a direction D defined along the axle 6 from the first end 20a to the second end 20b, i.e. also from the first end 20a to the second end 20b of the axle assembly 20, such that the rear bearing 2 bears against the force transducer 30. More particularly, the force transducer 30 of the exemplary embodiment, shown in greater detail in FIG. 3, further comprises a first end portion 32 extending in the direction D and bearing against in this case the adapter 32 and a second end portion 33 extending in the direction D against which the rear bearing 2 bears. An intermediate portion 31 extends in a radial direction between the first and second end portion and forms a disc shaped portion 31 which is coaxially arranged with respect to the rear bearing 3 (and hence to the axle 6 and the front bearing 2 as well). As may be seen in greater detail in FIG. 3, the diaphragm strain gauge 80 is arranged on the side facing away from the rear bearing 2.

Figure 3:
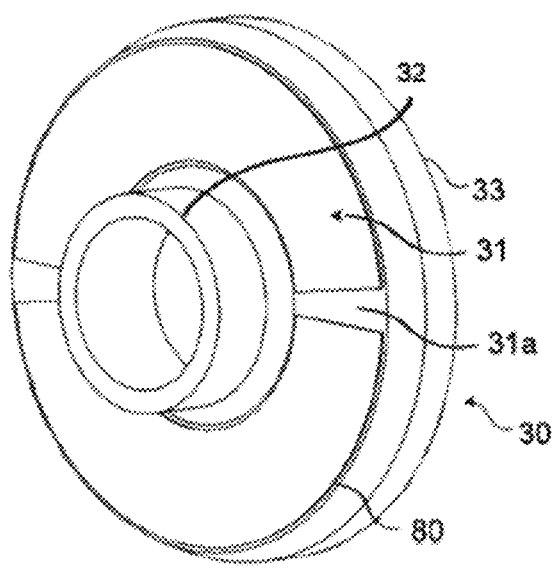
FIG. 3 is a perspective view of an exemplary force transducer according to one embodiment.

A force transducer 30 suitable for the embodiment of the drill in FIG. 1 is shown in FIG. 3. This force transducer measures the strain in the disc shaped portion 31, i.e. the measured quantity is a strain resulting from the relative displacement between the additional assembly and the housing due to the thrust force. To provide these values, the transducer comprises strain gauges. More particularly, a so called diaphragm or membrane strain gauge 80 is arranged on one side 31*a* of the disc shaped portion 31, i.e. on the annular face or surface 31*a* visible in FIG. 3. This circular, or annular, diaphragm is adapted to the shape of the disc shaped portion 31 and comprises a plurality of strain gauges arranged to measure the resulting strain in the disc shaped portion 31 of the force transducer 30.

Figure 2:
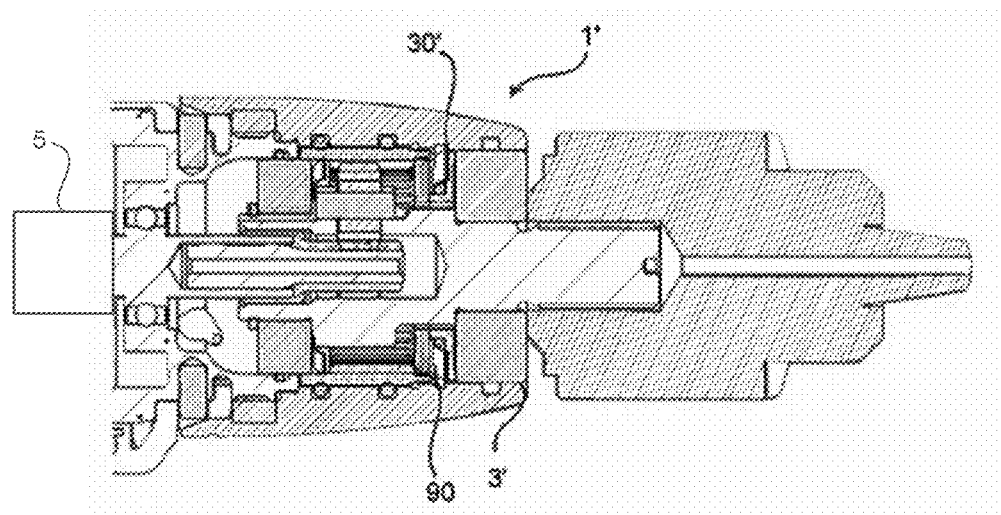
FIG. 2 is a cross sectional view of a front end of an exemplary power drill according to a second embodiment.

Turning to FIG. 2, a front end of an exemplary power drill 1', also in this case a handheld power drill, is shown in cross sectional view. The arrangement of the housing, bearings and front, axle assembly and front- and rear bearing is substantially the same as for the embodiment shown in FIG. 1 and will therefore not be described again.

Also as in the embodiment of FIG. 1, a force transducer 30' is arranged at, i.e. close to, the front end 10*a* of the housing 10'. More particularly, the force transducer is axially supported by the housing, in the illustrated embodiments the transducer bears against a washer 90 which in turn bears against the housing. Further, the additional assembly mentioned above in turn bears axially against the force transducer 30', in this case via the front bearing 3'. Hence, when drilling is performed, the thrust force on the additional assembly may be measured by the transducer portion against which the assembly bears since the force transducer is configured to sense the resulting strains and output a signal representing this axial force acting on the assembly. The force being due to the limited displacement of the additional assembly with respect to the housing mentioned above.

The force transducer 30' in the embodiment of FIG. 2, unlike the embodiment of FIG. 1, is however arranged behind the front bearing 3', that is to say behind in the direction D defined above, such that the front bearing 3' bears against the force transducer 30'.

Figure 4:
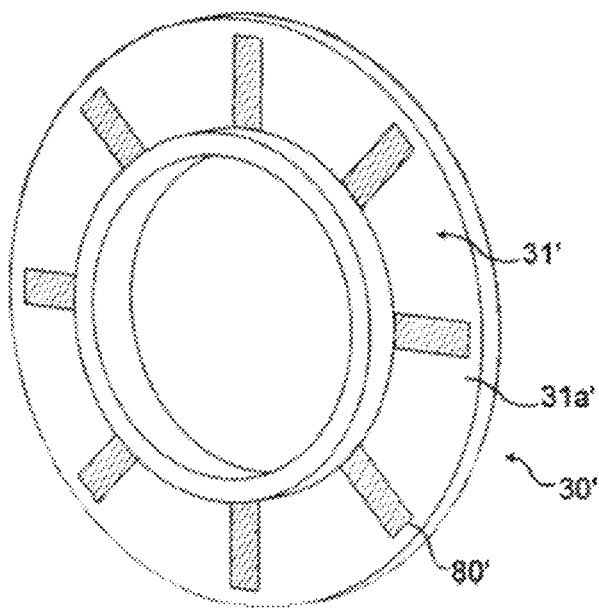
FIG. 4 is a perspective view of an exemplary force transducer according to one embodiment.

Further, turning to FIG. 4 showing one example of a force transducer 30' suitable to be arranged in the drill shown in FIG. 2, this exemplary embodiment may be described as a substantially disc shaped washer 30' which is adapted to be coaxially arranged with respect to the front bearing (and hence to the axle and rear bearing as well). I.e. the disc shaped portion 31' constitutes most of the transducer 30'.

In order to measure the strain in the disc shaped portion 31', the force transducer in FIG. 4 comprises a number of strain gauges 80', respectively arranged on a first side 31*a'* and a second opposite side (not visible in FIG. 4) of the disc shaped portion 31'. In the illustrated embodiment, eight strain gauges are arranged on the first side of the transducer 30', i.e. on the front and back side of the washer 30'.

Hereby, an accurate measurement of the thrust force may be achieved. Further, as an additional advantage as the thrust force is measured during the drilling, feedback may be provided to the operator during drilling and hence the quality of the resulting hole may be significantly improved. Needless to say, data may also be stored and used for analysis after the drilling is performed as well.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. For example, the power drill may be a fixtured drill. Further, any one of the disclosed exemplary embodiments of the force transducer may be arranged in any of the disclosed exemplary embodiments of the power drill.

Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A power drill comprising:
   a motor;
   a front bearing and a rear bearing, said front and rear bearing being arranged in a housing to thereby support an axle assembly, wherein the axle assembly comprises a first end drivingly connected to said motor and a second end configured to engage a drill attachment, wherein said axle assembly and at least one of said front bearing and/or said rear bearing further form an additional assembly movably arranged with respect to said housing such that a limited axial movement between said housing and said additional assembly is allowed; and
   a force transducer arranged in said housing, the force transducer comprising a first end portion extending along an axial direction defined from said first end to said second end of said axle assembly, a second end portion extending along said axial direction laterally in a direction opposite of the first end portion, and an intermediate portion defining a disc located between said first and second end portions and extending radially outward from the axial direction relative to said first and second end portions, said intermediate portion being coaxially arranged with respect to said front and rear bearing, wherein said force transducer is axially supported by said housing, and wherein said additional assembly is axially supported by said force transducer, said force transducer thereby being configured to sense a measured quantity over said disc shaped portion and output a signal representing an axial force acting on said additional assembly.

2. A power drill according to claim 1, wherein said force transducer is arranged behind said rear bearing, in the direction defined from said first end to said second end of said axle assembly, such that said rear bearing is axially supported by said force transducer.

3. A power drill according to claim 1, wherein said first end portion of said force transducer is axially supported by said housing, and wherein said additional assembly bears against said second end portion of said force transducer.

4. A power drill according to claim 1, wherein said force transducer is arranged behind said front bearing in the direction defined from said first end to said second end of said axle assembly, such that said front bearing is axially supported by said force transducer.

5. A power drill according to claim 1, wherein said measured quantity is a quantity indicative of a strain, and wherein said force transducer comprises at least one strain gauge.

6. A power drill according to claim 5, wherein said force transducer comprises at least one strain gauge, arranged on a first side of said disc shaped portion.

7. A power drill according to claim 6, wherein said force transducer comprises at least two strain gauges, each respectively arranged on a first and a second side of said disc shaped portion.

8. A power drill according to claim 5, wherein said at least one strain gauge is a diaphragm strain gauge is arranged on the first side of said disc shaped portion.

9. A power drill according to claim 1, further comprising a motor shaft connected to said motor at a first end and forming a sun gear at a second end, wherein said axle assembly comprises a planet carrier adapted to engage said drill attachment and at least one planet gear adapted to engage a ring gear arranged between said front bearing and said rear bearing, said motor shaft and planet carrier being coupled via said ring gear and said at least one planetary gear.

10. A power drill according to claim 1, wherein said axle assembly, said front bearing, and said rear bearing together form said additional assembly movably arranged with respect to said housing.

11. A power drill according to claim 1, wherein said power drill is a hand-held drill.

12. A force transducer for use in a power drill comprising a motor, and a front bearing and a rear bearing, said front and rear bearing being arranged in a housing to thereby support an axle assembly, wherein the axle assembly comprises a first end drivingly connected to said motor and a second end configured to engage a drill attachment, wherein said axle assembly and at least one of said front bearing and/or said rear bearing further form an additional assembly movably arranged with respect to said housing such that a limited axial movement between said housing and said additional assembly is allowed,
wherein the force transducer comprising:
a first end portion extending along an axial direction defined from said first end to said second end of said axle assembly and a second end portion extending along said axial direction laterally in a direction opposite of the first end portion, and an intermediate portion defining a disc located between said first and second end portions and extending radially outward from the axial direction relative to said first and second end portions, said intermediate portion being coaxially arranged with respect to said front and rear bearing,
wherein said force transducer is axially supported by said housing, and
wherein said additional assembly is axially supported by said force transducer, said force transducer thereby being configured to sense a measured quantity over said disc shaped portion and output a signal representing an axial force acting on said additional assembly.

13. A detachable front part for a power drill, where the power drill comprises a drill housing and a motor, the detachable front part comprising:
a front part housing adapted to be attached to the drill housing and a front bearing and a rear bearing, said front and rear bearing being arranged in said front part housing to support an axle assembly, wherein the axle assembly comprises a first end drivingly connected to said motor and a second end configured to engage a drill attachment, wherein said axle assembly and at least one of said front bearing and said rear bearing further form an additional assembly movably arranged with respect to said front part housing such that a limited axial movement between said front part housing and said additional assembly is allowed; and
a force transducer, wherein said force transducer is axially supported by said front part housing, the force transducer comprising a first end portion extending along an axial direction defined from said first end to said second end of said axle assembly, a second end portion extending along said axial direction laterally in a direction opposite of the first end portion, and an intermediate portion defining a disc located between said first and second end portions and extending radially outward from the axial direction relative to said first and second end portions, said intermediate portion being coaxially arranged with respect to said front and rear bearing, and
wherein said additional assembly is axially supported by said force transducer, said force transducer thereby being configured to sense a measured quantity over said disc shaped portion, and output a signal representing an axial force acting on said additional assembly.

14. A power drill according to claim 1, wherein at least one of the first end portion or the second end portion of the force transducer extends in a radial direction outward from the axial direction at a distance that is different than a distance that the intermediate portion extends in the radial direction outward from the axial direction.

15. A power drill according to claim 1, wherein the first end portion of the force transducer extends in a radial direction outward from the axial direction at a first distance and the second end portion of the force transducer extends in a radial direction outward from the axial direction at a second distance, wherein the first and second distances are different than a distance that the intermediate portion extends in the radial direction outward from the axial direction.

* * * * *